(12) United States Patent
Larson

(10) Patent No.: US 9,472,088 B2
(45) Date of Patent: Oct. 18, 2016

(54) APPARATUS AND METHOD FOR LOCATING AND UPDATING LOW-POWER WIRELESS COMMUNICATION DEVICES

(71) Applicant: Logicmark, LLC, Louisville, KY (US)

(72) Inventor: Jonathan Albert Larson, Novato, CA (US)

(73) Assignee: LOGICMARK, LLC, Louisville, KY (US)

( * ) Notice: Subject to any disclaimer, the term of this patent is extended or adjusted under 35 U.S.C. 154(b) by 12 days.

(21) Appl. No.: 14/467,268

(22) Filed: Aug. 25, 2014

(65) Prior Publication Data

US 2016/0055739 A1 Feb. 25, 2016

(51) Int. Cl.
  *G08B 1/08* (2006.01)
  *G08B 21/24* (2006.01)

(52) U.S. Cl.
  CPC ..................... *G08B 21/24* (2013.01)

(58) Field of Classification Search
  CPC ..... G08B 21/24; G08B 13/1427; H04B 1/16
  USPC ............. 340/539.13, 539.32, 506, 5.31, 5.8; 455/404.2, 567, 572, 574
  See application file for complete search history.

(56) References Cited

U.S. PATENT DOCUMENTS

| | | | |
|---|---|---|---|
| 5,805,999 A | 9/1998 | Inoue | |
| 6,269,257 B1 | 7/2001 | Cannon et al. | |
| 6,782,251 B2 | 8/2004 | Kagay, Jr. | |
| 7,205,895 B2 | 4/2007 | Outlaw et al. | |
| 7,864,035 B2 | 1/2011 | Ray | |
| 8,144,015 B2 | 3/2012 | Burket et al. | |
| 8,253,559 B2 | 8/2012 | Howard et al. | |
| 8,385,883 B2 | 2/2013 | Rajan et al. | |
| 2001/0029187 A1 | 10/2001 | Cannon et al. | |
| 2005/0020321 A1 | 1/2005 | Rotzoll | |
| 2006/0176167 A1* | 8/2006 | Dohrmann | G08B 25/001 340/506 |
| 2006/0252468 A1 | 11/2006 | Whitman | |
| 2008/0074265 A1* | 3/2008 | Schoen | G08B 13/1427 340/572.1 |
| 2009/0143047 A1 | 6/2009 | Hays et al. | |

FOREIGN PATENT DOCUMENTS

| | | |
|---|---|---|
| EP | 1151426 B9 | 7/2004 |
| WO | 0046774 | 8/2000 |

* cited by examiner

*Primary Examiner* — Tai Nguyen
(74) *Attorney, Agent, or Firm* — Patzik, Frank & Samotny Ltd.

(57) ABSTRACT

A low-power wireless communication device is in a sleep or standby mode of operation for extended periods of time, periodically becoming fully operational and issuing a "check in" message to a base station, thereby inhibiting the ability of the base station to assist in the locating of device, and remotely updating the settings or operational programming of the device much of the time. Upon receipt of a command to locate a misplaced low-power wireless device or to update the device, a base station queues an associated command in a task queue. Upon receipt of a check-in message from an associated low-power wireless device, indicating it is in a fully powered and communicative state of operation, the base station searches its task queue for applicable commands relative to the specific wireless device and executes them via communication with the now fully-operational wireless device.

4 Claims, 3 Drawing Sheets

APPARATUS AND METHOD FOR LOCATING AND UPDATING LOW-POWER WIRELESS COMMUNICATION DEVICES

FIELD OF THE INVENTION

This invention relates in general to wireless electronic communication devices and, in particular, to an apparatus and a method capable of both locating and updating the settings and/or programming of certain low-power wireless communication devices that are primarily in an uncommunicative mode of operation in order to preserve their battery life.

BACKGROUND OF THE INVENTION

Wireless technology is currently becoming increasingly popular, including being integrated into many types of devices that need to convey information only intermittently, and that have been previously networked, if at all, via hardwired communication channels. For example, wireless technology has now been integrated into many home monitoring systems, including transducers that indicate the security of doors and windows, home security video cameras which may transmit data primarily upon the detection of motion in their field of view, and weather monitoring equipment. Wireless technology is, of course, also increasingly popular in portable communication devices, such as cellular telephones and smartphones.

Another popular application of wireless communication technology is the Personal Emergency Response System (PERS) market, which has been estimated to have approximately one billion dollars in annual North American sales. A typical PERS system in a residence includes a base station that facilitates voice communication between one or multiple portable, wireless transceivers, on the one hand, and automatically called parties, on the other hand, such as a family member, an emergency services operator, or a private monitoring service. Such communication is typically initiated by a user, who wears a portable communications transceiver in the form of a PERS pendant, and who operates the device by pressing a "call" or "panic button of the transceiver in the event of an emergency.

As remote and portable wireless transceivers are typically battery operated, there is a significant desire to reduce their power consumption, in order to reduce the frequency with which the device's batteries must be recharged or replaced. One approach to reducing power consumption and extending battery life is device power management, whereby most or all of a device may be turned off, or placed in a low-power sleep or standby mode of operation, particularly for devices that require only intermittent communication with a base station, with the communication being initiated by the mobile device on either on a periodic or an on-demand basis, such as, for example, a PERS pendent or other mobile device, which may autonomously transition from a low-power sleep or standby mode to a transmit-only operational mode, wherein the radio transmitter portion of its transceiver is temporarily powered while the radio receiver portion of its transceiver remains unpowered, to perform a "check in" operation by transmitting a predetermined signal or message once every predetermined time period such as, for example, once every approximately thirteen hours.

As a result, these low-power wireless devices are commonly out of communication with their base station for extended periods of time. This frequent inaccessibility inhibits the ability of the base station to perform certain desirable functions, such as assisting in the locating of misplaced portable transceivers, and remotely updating the settings or operational programming of the portable transceivers.

Accordingly, it is an object of the present invention to provide an apparatus and a method for locating a misplaced low-power wireless communication device.

It is another object of the present invention to provide an apparatus and a method for remotely updating the settings of a low-power wireless communication device.

It is yet another object of the present invention to provide an apparatus and a method for remotely updating the operational programming of a low-power wireless communication device.

These and other objects, features and advantages of the invention will be apparent from the following detailed disclosure, taken in conjunction with the accompanying sheets of drawings, wherein like reference numerals refer to like parts.

SUMMARY OF THE INVENTION

The present invention comprises a method of locating a misplaced low-power wireless communication device that is primarily in an uncommunicative mode of operation. First, a command is received by a base unit, indicating that a misplaced low-power wireless communication device is to be found. The base unit adds a "locate mobile device" command to a task queue that the base unit maintains in its memory. Next, the base unit listens for mobile messages from the low-power wireless communication device. Upon receipt of a mobile message, the base unit determines if it is a periodic check-in message from the misplaced low-power wireless communication device. If so, the base unit searches its task queue for a locate mobile device command, and then issues a find command message to the low-power wireless communication device, prompting the misplaced low-power wireless communication device to take action assisting in its location, such as, for example, the issuance by low-power wireless communication device of an audible alert, such as a periodic beeping or chirping sound. In an embodiment of the present invention, the low-power wireless communication device comprises a mobile unit of a Personal Emergency Response System, and the above described steps are performed by a base unit of a Personal Emergency Response System. Moreover, in an embodiment of the invention, the low-power wireless communication device, when issuing its periodic check-in message, also powers its radio receiver for either a predetermined amount of time, or until a responsive communication is received from a base unit.

The present invention also comprises a method of updating a low-power wireless communication device that is primarily in an uncommunicative mode of operation. First, a command is received by a base unit, indicating that the base unit is to perform at least one of modifying a setting and modifying programming of the low-power wireless communication device. The base unit adds a "modify setting" command and/or a "modify programming" command to a task queue that the base unit maintains in its memory. Next, the base unit listens for mobile messages from the low-power wireless communication device. Upon receipt of a mobile message, the base unit determines if it is a periodic check-in message from a low-power wireless communication device that is to be updated. If so, the base unit searches its task queue for a "modify setting" command and/or a "modify programming" command. If a "modify setting" command is found in the task queue, the base unit issues a "modify setting" message to the low-power wireless communication device, which has temporarily powered its radio receiver upon the issuance of a "check in" message, prompting the low-power wireless communication device to update at least one parameter or setting with data contained within the modify setting command. If a "modify programming" command is found in the task queue, the base unit issues at least one message to the low-power wireless communication device containing replacement or additional programming instructions, prompting the low-power wireless communication device to load and begin execution of the replacement or additional programming instructions. As in the prior embodiment of the present invention, the low-power wireless communication device comprises a mobile unit of a Personal Emergency Response System, and the above described steps are performed by a base unit of a Personal Emergency Response System.

DETAILED DESCRIPTION OF THE INVENTION

Figure 1:
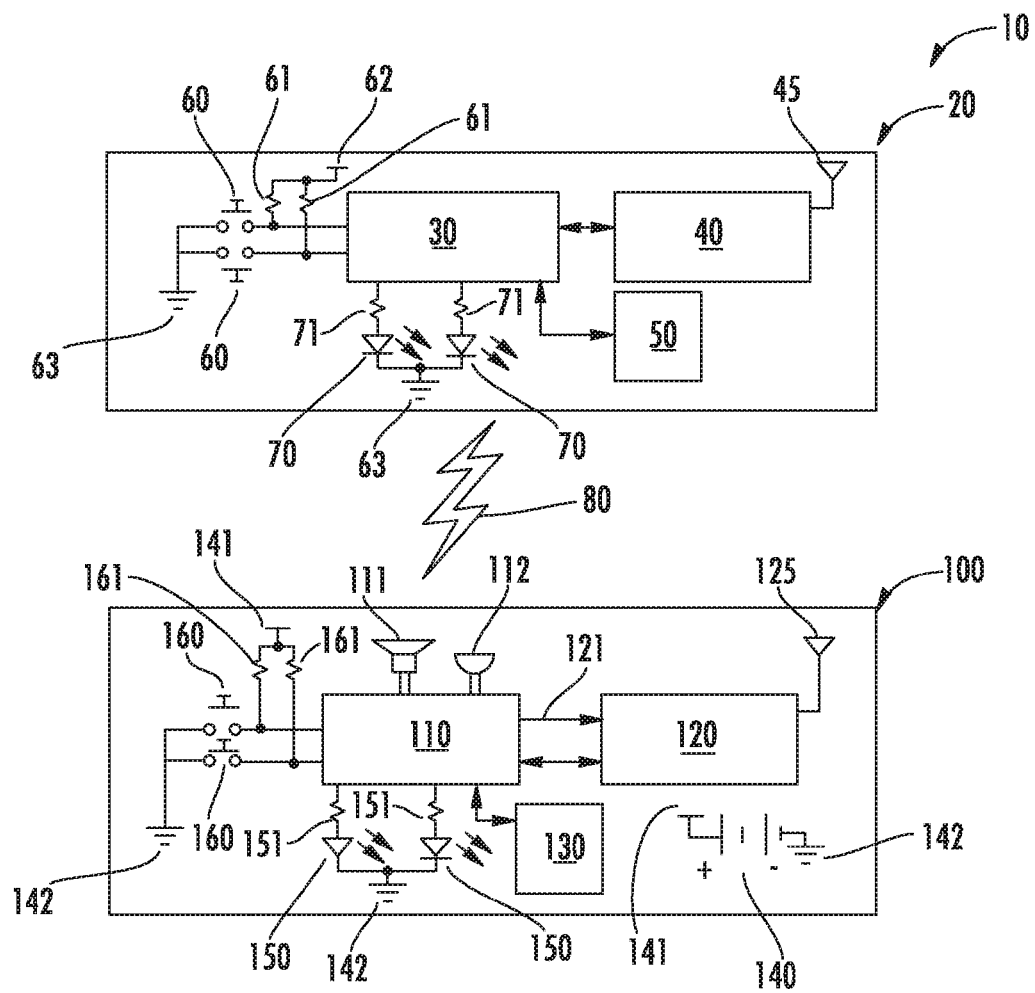
FIG. 1 is schematic diagram of a communication system including a base station and a low-power wireless communication device.

While this invention is susceptible of embodiment in many different forms, there is shown in the drawings and will herein be described in detail several specific embodiments, with the understanding that the present disclosure is to be considered merely an exemplification of the principles of the invention and is not intended to limit the invention to the embodiments disclosed A mobile-base communication system 10 in accordance with the present invention is shown in FIG. 1 as comprising base unit 20 and mobile unit 100, communicating with each other via radio waves 80. The bidirectional communication protocol between base unit 20 and mobile unit 100 may comprise the Digital Enhanced Cordless Telecommunications ("DECT") standard, commonly used in digital cordless telephone handsets, or other suitable wireless communications protocols, such as wireless network-based communications protocols (e.g., Bluetooth and the IEEE 802.11 family of protocols). Although only a single mobile unit 100 is shown in FIG. 1, base unit is preferably capable of communicating with a plurality of mobile units 100, each of which is assigned a unique identifier for use within the DECT communication protocol.

Base unit 20, which may be, for example, a PERS system base unit, comprises microcontroller 30, radio transceiver 40, antenna 45, network interface 50, switches 60, and display LEDs 70. Microcontroller 30 includes an internal microprocessor, program and data memory units, analog and digital input/output ports, timers, and power management circuitry and may comprise, for example, a PIC microcontroller manufactured by Microchip Technology Inc. Radio transceiver 40 is coupled to microcontroller 30 via a digital data interface and may comprise a special purpose integrated circuit implementing a specific communication protocol, such as the DECT standard, and having power management capability and may comprise, for example, an LMX3161 radio transceiver manufactured by Texas Instruments, Inc.

Network interface 60 enables microcontroller 50 to communicate externally via, for example, a conventional analog telephone network, and may comprise, for example, a TP3420A integrated circuit manufactured by Texas Instruments, Inc.

The anodes of display LEDs 70 are coupled to output pins of a data port of microcontroller 30 via current limiting resistors 71. The cathodes of display LEDs 70 are coupled to ground 63. Accordingly, microcontroller 30, by controlling the individual logic level of its associated digital data port output pins, may programmatically turn display LEDs on and off to indicate, for example, whether or not base unit 20 is currently in setup mode, or whether or not base unit 20 is currently scanning for mobile units 100 to communicate with. Switches 60 are for user input purposes and may comprise, for example, momentary pushbutton single pole, single throw ("SPST") switches. One contact of each switch is coupled to a digital port input pin of microcontroller 30, with intermediate pull-up resistors 61 being coupled to supply voltage 62. The other contact of each switch 60 is coupled to ground 63. By periodically poling the value of a data input port associated with switches 60, microcontroller 30 may determine whether each individual switch 60 is presently in a closed (logic zero at the input port) or open (logic one at the input port) configuration. Specific functions may be assigned to each switch 60. For example, a user depressing a specific switch 60 may command or initiate a "find" operation to be performed, towards locating a lost or misplaced mobile unit 100, or to command or initiate a system self-test operation.

Mobile unit 100, which may be, for example, a PERS system mobile pendant, comprises microcontroller 110, radio transceiver 120, antenna 125, power management timer 130, battery 140, speaker 111, microphone 112, display LEDs 150 and switches 160. Microcontroller 110 includes an internal microprocessor, program and data memory units, analog and digital input/output ports, timers, and power management circuitry and may comprise, for example, a PIC microcontroller manufactured by Microchip Technology Inc. Radio transceiver 120 is coupled to microcontroller 110 via a digital data interface and may comprise a special purpose integrated circuit implementing a specific communication protocol, such as the DECT standard, and having power management capability and may comprise, for example, an LMX3161 radio transceiver manufactured by Texas Instruments, Inc., or, alternatively, another transceiver having separate power management capability for both the transmitter and receiver portions of the transceiver Power management timer 130 is employed to manage the power state of microcontroller 110, enabling microcontroller 110 to commonly remain in a low-power, sleep mode, until a timer trigger initiated by power management timer 130 causes microcontroller 110 to transition to full operational mode. Microcontroller 110, in turn, governs the power state of transceiver 120, leaving it unpowered much of the time, including whenever microcontroller 110 is in low-power, sleep mode of operation. This, in turn, further conserves the power stored within battery 140. Power management timer 130 may, alternatively, be an internal timer contained within the power management circuitry of microcontroller 110.

The anodes of display LEDs 150 are coupled to the output pins of a digital data port microcontroller 110 via current limiting resistors 151. The cathodes of display LEDs 150 are coupled to ground 142. Accordingly, microcontroller 110, by controlling its associated digital data port output pins, may programmatically turn display LEDs on and off to indicate, for example, whether or not mobile unit 100 is currently in setup mode, or whether or not mobile unit 100 is currently scanning to establish communication with base unit 20. Switches 160 are for user input purposes and may comprise, for example, momentary pushbutton SPST switches. One contact of each switch is coupled to a digital data port input pin of microcontroller 110, with intermediate pull-up resistors 161 being coupled to supply voltage 141. The other contact of each switch is coupled to ground 142. By periodically poling the value of a data input port associated with switches 160, microcontroller 110 may determine whether each switch 110 is presently in a closed (logic zero at the input port pin) or open (logic one at the input port pin) configuration. Specific functions may be assigned to each switch 160. For example, a user depressing a specific switch 160 may initiate an emergency communication operation, establishing 2-way communication by causing base unit 20 to dial and establish a telephone connection with emergency personnel or a family member its telephone network interface 50, enabling the user to converse with the called party via speaker 111 and microphone 122. Moreover, switches 160 are preferably also coupled to power management timer 130 to cause an immediate transition of microcontroller 110 to full powered mode (if necessary) upon the user activation of any switch.

In a preferred embodiment, to conserve the charge of battery 140, power management timer 130 is configured to "wake" microcontroller 110 only infrequently, such as approximately once every thirteen hours. Each time microcontroller 110 transitions to fully powered mode as commanded by power management timer 130, it powers both the transmitter and receiver portions of its transceiver 120, which is likewise generally kept unpowered to conserve battery charge, and issues a "check in" communication message to base unit 20 via transceiver 120 and antenna 125 using radio waves 80. The check in communication from a given mobile unit 100 permits the mobile unit to provide base unit 20 with an indication of its battery charge and overall status, and, in turn, to potentially receive a response message from base unit 20 indicating the base unit's status. This permits both base unit 20 and each mobile unit 100 to provide a visual or audible indication of any system errors or warning conditions that may be encountered. The receiver portion of transceiver 120 is then used to listen for a message, either responsive to the check-in message or otherwise, from base unit 20. If the message from base unit 20 is a shutdown command, or a system health message indicating that the overall system is fully operational, microcontroller 110 will then cause both the transmitter and receiver portions of transceiver 120 to again be unpowered, and microcontroller 110 will then reenter its low-power, sleep mode, until the next periodic awakening prompted by power management timer 130.

In addition to an indication of overall system health, the message from base unit 20 may also include a command or indication that mobile unit 100 is to perform a specific operation. Specifically, and as detailed further below, a message from base unit 20 to mobile unit 100 may initiate a "find" operation, indicating that the mobile unit has been misplaced, commanding the mobile unit to take action, such as emitting periodic beeps or other sounds, to assist in its being located by the user. Moreover, a message from the base unit may be used to initiate a data transfer from the base unit to the mobile unit. The data transfer may consist of new setting information, such as, for example, remotely commanding the volume setting of the mobile unit, or the frequency with which the mobile unit transitions from sleep to active modes of operation. Alternatively, the data transfer may be a programming upgrade, which microcontroller 110 is to transfer to its internal program memory and then begin executing.

Figure 2:
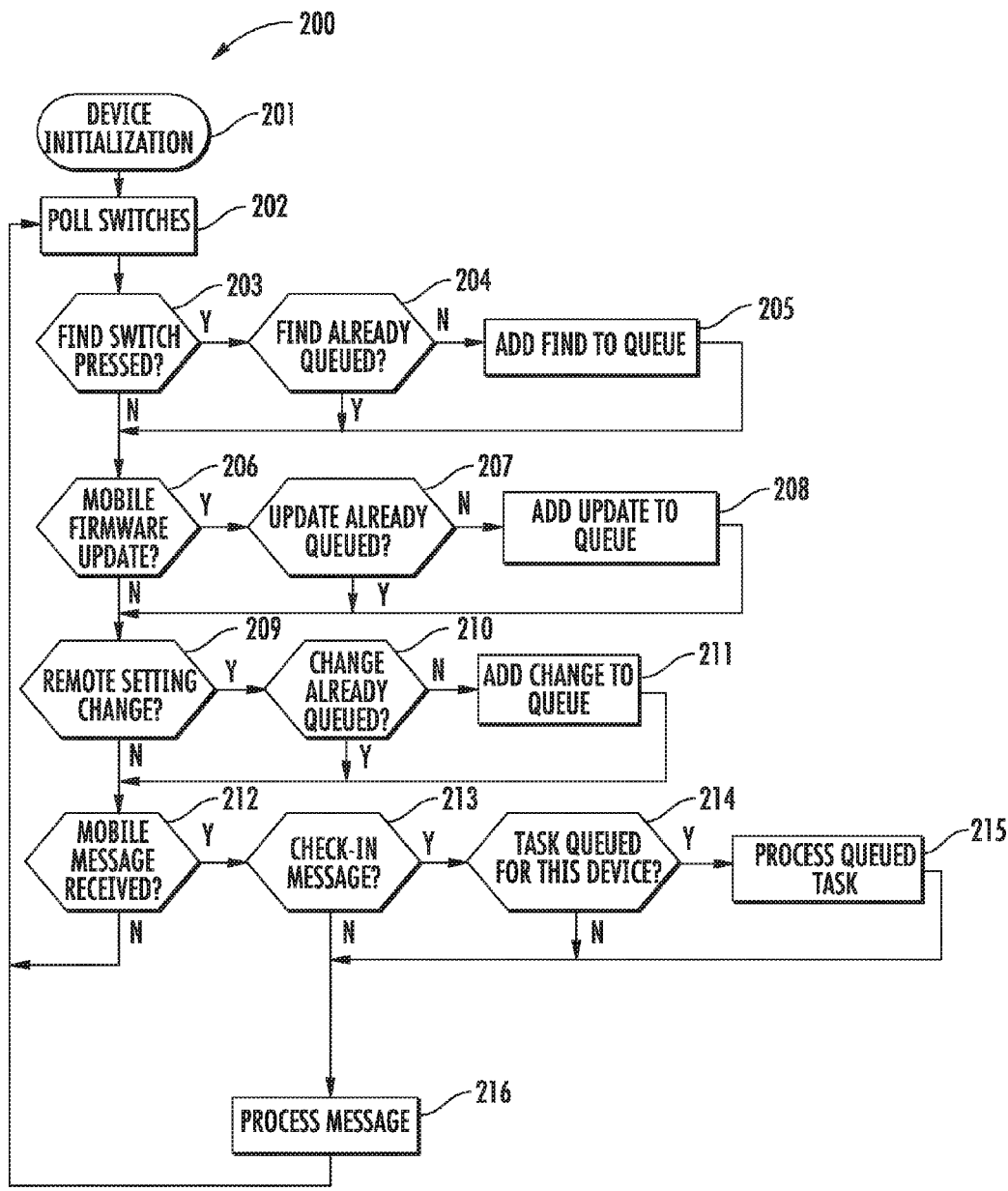
FIG. 2 is a flowchart of a portion of the operation of the base station.

Referring to FIG. 2, a portion 200 of the operation of the programming of microcontroller 30 of base unit 20 is shown. In step 201, device initialization of base unit 20 is performed, such as when power is initially applied to base unit 20. Next, in step 202, microcontroller 30 polls the position of each switch 60. In step 203, a search is made to determine if the user has depressed a switch indicating that a base unit has been misplaced, and a "find" operation is to be performed. If so, transition is taken to step 204, where a search is made of a pending task queue maintained within the memory of microcontroller 30 to determine whether a find operation is already pending in the queue. If so, transition is taken to step 206. If not, a find operation is added to the task queue, and transition is taken to step 206.

The task queue of microcontroller 30, in general, is preferably a first-in, first-out ("FIFO") queue of tasks that are to be performed in association with one or more mobile units 100 associated with base unit 20. As detailed further below, inasmuch as each mobile unit 100 is left in a substantially unpowered, battery-conserving mode of operation most of the time, tasks to be performed in association with a particular mobile unit generally cannot be immediately performed, as each mobile unit is incommunicative, with its transceiver being unpowered, when in its normal, low-power, sleep mode of operation. Accordingly, a queue is maintained within the memory of microcontroller 30 of tasks that have been triggered or commanded, such as by user input, but that are not currently capable of being performed in view of the lack of current communication with an applicable mobile unit 100.

Within step 206, a test made to determine if base unit 20 has been commanded to perform an update of the firmware programming within one or more mobile units 100. Such a command, and the associated data, may be received from base unit 20 from a remote computer via network interface 50 of base unit 20. The remote computer may, for example, be associated with a manufacturer of communication system 10 and maintained for purposes of remotely updating previously purchased communication systems 10 with the latest version of software releases. If the base unit 20 has been commanded to perform a firmware update, transition is taken to step 207, where a search is made of the pending task queue to determine whether a firmware update operation is already pending in the queue. If so, transition is taken to step 209. If not, a firmware update operation is added to the task queue, and transition is taken to step 209.

Within step 209, a test is made to determine if base unit 20 has been commanded to change a setting or parameter within the memory of microcontroller 110 of one or more mobile units 100. Such a command may be received by base unit 20, for example, within a data message received via network interface 50 from a host computer. Alternatively, such a command may be from some form of user input to base unit 20, such as a function associated with a designated pushbutton switch 60. If such a command has been received, transition is taken to step 210, where a search is made of the pending task queue to determine whether a remote setting change operation is already pending in the queue. If so, transition is taken to step 212. If not, a remote setting change operation is added to the task queue, and transition is taken to step 212.

In step 212, a test is made to determine if a complete mobile message has been received from a mobile unit 100 associated with base unit 20. If not, transition is taken to step 202, where user activated switches 60 are again polled for activity. Otherwise, transition is taken to step 213, where a test is made to determine if the mobile message received from a mobile unit 100 was a periodic check-in message, indicating that a mobile unit 100 has recently reawakened from its normal, low-power state and is checking in with its associated base unit 20. If not, transition is taken to step 216, where the mobile message, which may comprise, for example, a user-initiated emergency communication, is processed, after which transition is taken to step 202, where user activated switches 60 are again polled for activity.

Otherwise, transition is taken to step 214, where a test is made to determine if the task queue contains at least one queued task associated with the specific mobile unit 100 that issued the check-in message. If not, transition is taken to step 216, where usual check-in message processing occurs. For example, if the check-in message includes an indication that a mobile unit 100 has little remaining battery power or is in some way malfunctioning, base unit 20 may issue an audible or visual alert to the user.

If, however, there is at least one task queued for the mobile unit 100 that is currently checking in, all queued tasks for that mobile unit 100 are removed from the queue, and transition is taken to step 215 where each task just removed from the queue is sequentially processed.

If the task (or one of the tasks) to be currently processed in step 215 is the "find" task, indicating that the associated mobile unit 100 has been misplaced, a "find" message is transmitted from base unit 20 to the mobile unit 100. Receipt of the find message by the mobile unit 100 causes the mobile unit to remove power from its transceiver to conserve battery power, and to begin emitting a periodic sound, such as a beeping sound every several seconds, to assist the user in locating the misplaced mobile unit 100. Once the user has located the mobile unit 100, he or she may stop the beeping and terminate the find operation by pressing any user input button 160 (such as an emergency call button or a system test button) on the mobile unit 100. This, in turn, causes the mobile unit 100 to return to its fully unpowered, sleep mode.

If the task (or one of the tasks) to be currently processed in step 215 is the mobile firmware update task, indicating that the programming of the associated mobile unit 100 is to be updated, a "firmware update" message is transmitted from base unit 20 to the mobile unit 100. This begins what may be a relatively lengthy sequence of data packets containing the new firmware to be transmitted from base unit 20 to mobile unit 100, with each packet being checked for transmission errors by mobile unit 100, which then issues responsive acknowledgement messages (prompting transmission of the next packet in sequence by base unit 20) or negative-acknowledgement messages (in the case of a transmission error being detected by mobile unit 100, prompting retransmission of the current data packet by base unit 20). Upon the receipt of a complete set of firmware update messages, microcontroller 110 of mobile unit 100 will initiate a system reboot. Upon rebooting, microcontroller 110 will automatically replace its prior execution firmware with the new firmware just received from base unit 20. Mobile unit 100 will then continue its normal operation in accordance with its updated programming.

If a task (or one of the tasks) to be currently processed in step 215 is the remote setting change task, indicating that one or more settings or parameters of the associated mobile unit 100 is to be replaced with a new value or values, an "update setting" message is transmitted from base unit 20 to the mobile unit 100. This message includes an identifier or identifiers of the setting(s) or parameter(s) to be updated, together with the new associated value(s). Upon receipt of the update setting message, mobile unit 100 will replace its existing setting(s) or parameter(s) identified in the message with the new values also contained in the message. This permits, for example, optional functional features of mobile unit 100 to be selectively and remotely activated or deactivated, or settings of mobile unit 100, such as speaker volume, to be remotely modified. Transition is then taken to step 216, where usual check-in message processing occurs.

Figure 3:
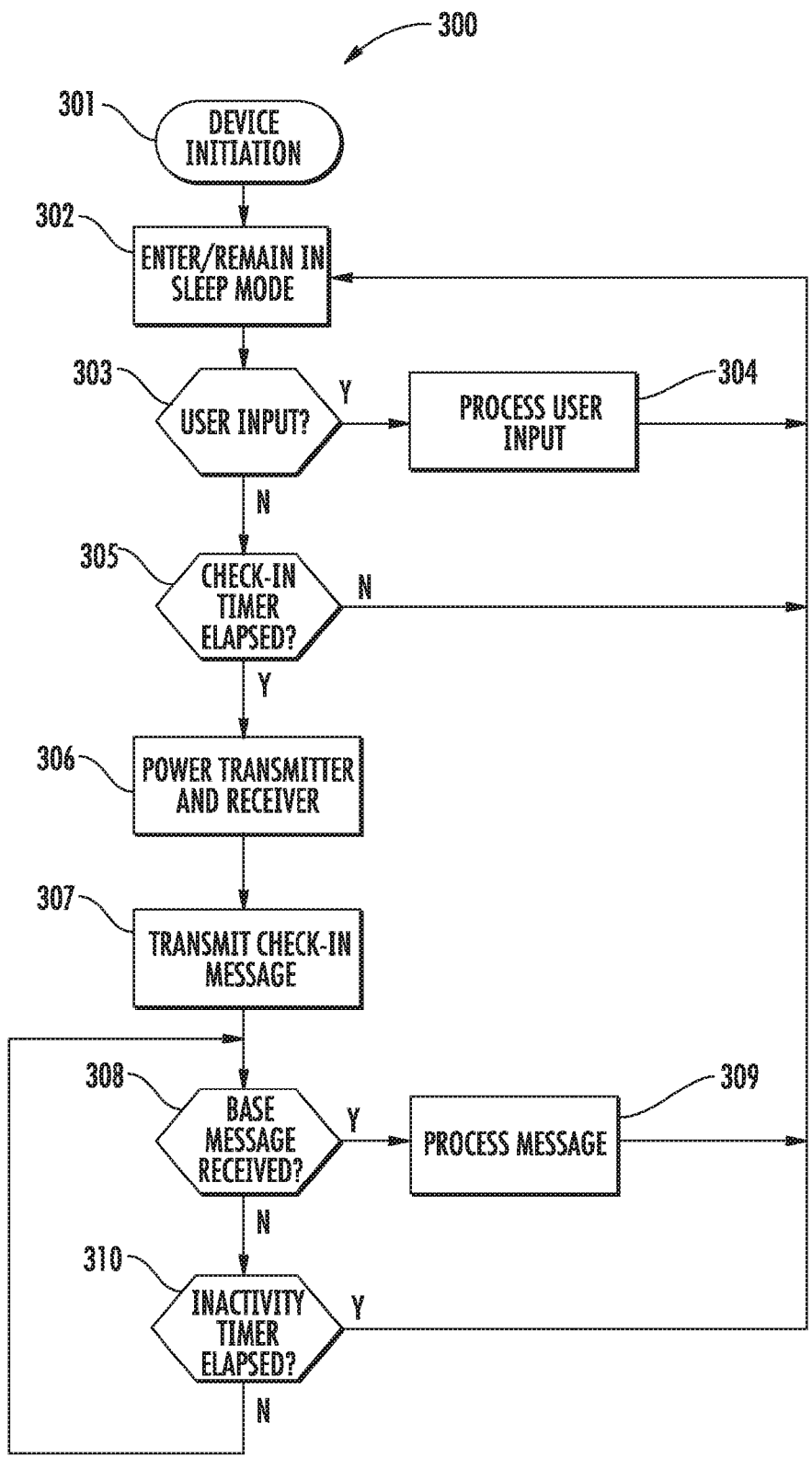
FIG. 3 is a flowchart of a portion of the operation of the low-power wireless communication device.

Referring to FIG. 3, a portion 300 of the operation of microcontroller 110 of mobile unit 100 is shown. In step 301, device initialization of mobile unit 100 is performed, such as when power is initially applied to mobile unit 100. Next, in step 302, microcontroller 302 enters a sleep or lower power mode or, if already in such a mode, remains there. In step 303, a test is made for a user input, such as, in the case where mobile unit 100 is a PERS pendant, pressing a call" or "panic button associated with one of switches 160. This test may be made by polling a data input port, if microcontroller 110 has such capability while in low-power mode. Alternatively, the outputs of switches 160 may be coupled to dedicated interrupt input pins of microcontroller 110 that are configured to cause microcontroller 110 to exit low-power mode upon an external interrupt trigger condition.

In either case, if a user input has occurred, microcontroller 110 exits low-power or sleep mode, and transition is taken to 304, where the user input is processed. Depending upon the particular user input being processed, microcontroller may remain in full power mode for some period of time, such as when a two-way telephone conversation is initiated by the user. Otherwise, if no user input has occurred, transition is taken to step 305, where a test is made to determine whether power management timer 130 has elapsed. If not, transition is taken back to step 302, where mobile unit 100 remains in low-power mode. Otherwise, transition is taken to step 306, where microcontroller 110 exits lower power mode, and both the transmitter and receiver of transceiver 120 are powered.

Next, in step 307, microcontroller 110, in conjunction with the transmitter portion of transceiver 120, issues a "check-in", or "I'm alive" indicative message, to base unit 20. Next, in step 308, microcontroller determines whether a complete message has been received from base unit 20. If so, transition is taken to step 309, where the message is processed by microcontroller 110. Otherwise, transition is taken to step 310, where a test is made to determine if an inactivity timer has elapsed. The inactivity timer is a countdown timer that may be set, for example, to a duration of approximately two minutes. If the inactivity timer has elapsed, transition is taken to step 302, where transceiver 120 is again unpowered, and microcontroller 110 enters a low-power or sleep mode of operation. Otherwise, transition is taken back to step 308.

In step 309, several different types of messages from base unit 20 may be processed. For example, if mobile unit 100 has been lost or misplaced, the message to be processed may be a "find" message, causing mobile unit 100 to remove power from its transceiver to conserve battery power, and to begin emitting a periodic sound, such as a beeping sound every several seconds, to assist the user in locating the misplaced mobile unit 100. Alternatively, the message may be a "firmware update" message, which, when received, begins what may be a relatively lengthy sequence of data packets containing the new firmware to be transmitted from base unit 20 to mobile unit 100. Moreover, the message may alternatively be an "update setting" message, causing mobile unit 100 to replace existing setting(s) or parameter(s) with new values contained in the message. The updated setting may be, for example, a change in the predetermined interval in which mobile unit 100 is to periodically exit sleep or low-power mode and issue a "check in" message. Furthermore, if base unit 20 has no tasks queued for mobile unit 100, the message to be processed may be a "sleep immediately" command, wherein, rather than wait for the expiration of the inactivity countdown timer, base unit 20 will immediately transition to step 302, turn off its transceiver, and enter sleep or low-power mode.

It will be understood that modifications and variations may be effected without departing from the scope of the novel concepts of the present invention, and that this application is limited only by the scope of the appended claims.

The invention claimed is:

1. A method of updating a low-power wireless communication device that is primarily in an uncommunicative mode of operation, the method comprising, at a base unit, the steps of:
    receiving a command instructing the low-power wireless communication device to perform at least one of modifying a setting and modifying programming of the low-power wireless communication device;
    adding a modify setting command to a task queue if the command received by the low-power wireless communication device instructs the low-power wireless communication device to modify a setting of the low-power wireless communication device;
    adding a modify programming command to the task queue if the command received by the low-power wireless communication device instructs the low-power wireless communication device to modify programming of the low-power wireless communication device;
    listening for mobile messages from the low-power wireless communication device;
    determining if a mobile message received from the low-power wireless communication device is a periodic check-in message;
    searching the task queue for modify setting commands and modify programming commands upon receipt of the periodic check-in message;
    if a modify setting command is found in the task queue, issuing a modify setting command message to the low-power wireless communication device, prompting the low-power wireless communication device to update at least one parameter or setting with data contained within the modify setting command; and;
    if a modify programming command is found in the task queue, issuing at least one message to the low-power wireless communication device containing replacement or additional programming instructions, prompting the low-power wireless communication device to load and begin execution of the replacement or additional programming instructions.

2. The method according to claim 1, wherein the low-power wireless communication device comprises a mobile unit of a Personal Emergency Response System.

3. The method according to claim 1, wherein the base unit is a component of a Personal Emergency Response System.

4. The method according to claim 1, further comprising, at the low-power wireless communication device, the steps of:
    exiting a low-power mode of operation by powering both a transmitter and receiver portion of a transceiver;
    issuing the periodic check-in message;
    determining if either a modify setting command or a modify programming command has been issued by the base unit;
    if a modify setting command has been issued, updating at least one program setting low-power wireless communication device in accordance with the modify setting command; and
    if a modify programming command has been issued by the base unit, updating at least a portion of a program of the low-power wireless communication device in accordance with the modify programming command.

\* \* \* \* \*